(12) United States Patent
Maruyama

(10) Patent No.: US 7,815,449 B2
(45) Date of Patent: Oct. 19, 2010

(54) MEMORY CARD CONNECTOR

(75) Inventor: Shinichiro Maruyama, Yamato (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 12/684,561

(22) Filed: Jan. 8, 2010

(65) Prior Publication Data

US 2010/0112840 A1 May 6, 2010

Related U.S. Application Data

(63) Continuation of application No. 10/587,318, filed as application No. PCT/US2005/002156 on Jan. 24, 2005, now Pat. No. 7,708,574.

(30) Foreign Application Priority Data

Jan. 26, 2004 (JP) ............................. 2004-016979

(51) Int. Cl.
*H01R 13/62* (2006.01)
(52) U.S. Cl. .................................................. 439/159
(58) Field of Classification Search ................ 439/159, 439/160, 152, 153, 630, 637
See application file for complete search history.

(56) References Cited

U.S. PATENT DOCUMENTS

| | | | |
|---|---|---|---|
| 6,095,868 A * | 8/2000 | Hyland et al. ............... | 439/630 |
| 6,863,571 B2 * | 3/2005 | Sato et al. .................... | 439/630 |
| 6,997,751 B2 * | 2/2006 | Miyamoto ................... | 439/630 |
| 2005/0095917 A1 * | 5/2005 | Miyamoto ................... | 439/630 |
| 2006/0020581 A1 * | 1/2006 | Dettinger et al. ............... | 707/3 |
| 2006/0183378 A1 * | 8/2006 | Tanaka et al. ............... | 439/630 |
| 2007/0049081 A1 * | 3/2007 | Anzai et al. .................. | 439/159 |
| 2007/0202750 A1 * | 8/2007 | Nishiwaki et al. ........... | 439/630 |
| 2009/0053918 A1 * | 2/2009 | Zhao et al. ................... | 439/153 |

* cited by examiner

*Primary Examiner*—Alexander Gilman
(74) *Attorney, Agent, or Firm*—Timothy M. Morella

(57) ABSTRACT

A memory card connector includes an insulative housing having a terminal-mounting section which mounts a plurality of conductive terminals having contact portions for engaging appropriate contacts on a memory card. The housing at least in part defines a card-receiving cavity for receiving the memory card. A card eject mechanism includes a slider movably mounted on the housing. The slider is engageable with the memory card for movement therewith into and out of the cavity between an inserted connection position and a withdrawal position. A slide lock member is mounted on the connector, independent of the eject mechanism, and is engageable with the slider to hold the slider in its inserted connection position. An ejection control member is mounted on the housing for releasing the slide lock from engagement with the slider to allow the slider and memory card to be ejected.

14 Claims, 10 Drawing Sheets

MEMORY CARD CONNECTOR

REFERENCE TO RELATED APPLICATIONS

The Present Application is a Continuation Application of U.S. patent application Ser. No. 10/587,318 (U.S. Publication No. 2008/0050954), filed on Apr. 30, 2007, which issued on May 4, 2010 as U.S. Pat. No. 7,708,574. U.S. patent Ser. No. 10/587,318 is a U.S. National Phase entry of PCT Patent Application No. PCT/US2005/0002156, filed on 24 Jan. 2005, which is a PCT Application of Japanese Patent Application No. 2004-016979, filed on 26 Jan. 2004, which issued on 18 Sep. 2009 as Japanese Patent No. 4376075. The contents of each of the aforementioned Patents and Applications are fully incorporated in their entireties herein.

BACKGROUND OF THE PRESENT APPLICATION

Memory cards are known in the art and contain intelligence in the form of a memory circuit or other electronic program. Some form of card reader reads the information or memory stored on the card. Such cards are used in many applications in today's electronic society, including video cameras, digital still cameras, smart phones, PDA's, music players, ATMs, cable television decoders, toys, games, PC adapters, multimedia cards and other electronic applications. Typically, a memory card includes a contact or terminal array for connection through a card connector to a card reader system and then to external equipment. The connector readily accommodates insertion and removal of the card to provide quick access to the information and program on the card. The card connector includes terminals for yieldingly engaging the contact array of the memory card.

The memory card, itself, writes or reads via the connector and can transmit between electrical appliances, such as a word processor, personal computer, personal data assistant or the like. The card may be used in applications such as mobile or cellular telephones which are actuated and permit data access after identifying an identification code stored on a SIM (subscriber identification module) card. The SIM card has a conductive face with an array of contacts, and the mobile phone has a SIM card connector with terminals for electrical connection with the contacts of the SIM card to ensure the subscriber identification confirmation.

A typical memory card connector includes some form of dielectric housing, which is covered by a metal shell. The metal shell may be stamped and formed of sheet metal material and formed substantially into a box-shape. The metal shell and the housing combine to define a card-receiving cavity. One end of the cavity is open to form a card-insertion opening. The dielectric housing may be generally L-shaped or U-shaped and includes a rear terminal-mounting section at the rear of the cavity, and at least one longitudinal side wall section extends forwardly from one or both ends of the rear section at one or both sides of the cavity. The metal shell has a top plate substantially covering the dielectric housing, with side plates extending downwardly over the side wall sections of the housing. One or both of the side wall sections of the housing define the sides of the card-receiving cavity.

Some card connectors include a card eject mechanism whereby the memory card is simply inserted into the connector, and the eject mechanism is used to facilitate removal of the card from the connector. Some eject mechanisms include slider members which engage the memory card for movement therewith into and out of the connector. Latches, cams, eject devices and other operative components then are operatively associated with the slider rather than the memory card itself. One type of card eject mechanism includes a heart-shaped cam slot in the slider, with a pin member operatively biased into the heart-shaped cam slot, and with a spring member to normally bias the slider in a direction of withdrawal of the memory card. This type of card eject mechanism is called a "push/push type" ejector in that the memory card first is pushed into the cavity of the connector to a latched operative position, and a second push on the card is effective to release the card and allow the spring to eject the card from its latched position. Some prior art memory card connectors of the character described above are shown in Japanese Patent Laid-Open Nos. 2002-252047; 2002-319451 and 2003-68399.

Such push/push type eject mechanisms continue to have various problems. For instance, after the memory card first is pushed into the cavity of the connector to a latched operative position, it is necessary that the memory card project partially from the connector while being held in the latched position so that it is accessible for the second "push" when it is desired to eject the card from its latched position. Therefore, such electrical appliances as digital cameras, cellular telephones and other electronic devices must be sized or notched so that the rear end of the card is partially exposed to enable the second "push" on the card. Partial exposure of the card can cause erroneous or inadvertent pushing of the card into the cavity, thereby causing an undesired ejection of the card. This can lead to the card being lost. In addition, notching of the rear of the connector to partially expose the card involves costly manufacturing processes. This is particularly true with the ever-increasing miniaturization of such connectors. Some connectors may not even be constructed to allow for such notching. The present application is directed to solving these problems by providing a system wherein it is not necessary for the card to be exposed at the rear of the connector in order to effect ejection of the card there from.

SUMMARY OF THE PRESENT APPLICATION

An object, therefore, of the present application is to provide a new and improved memory card connector of the character described.

In the exemplary embodiment of the disclosure of the present application, the memory card connector includes an insulative housing having a terminal-mounting section, which mounts a plurality of conductive terminals having contact portions for engaging appropriate contacts on a memory card. The housing at least in part defines a card-receiving cavity for receiving the memory card. A card eject mechanism includes a slider movably mounted on the housing. The slider is engageable with the memory card for movement therewith into and out of the cavity between an inserted connection position and a withdrawal position. A slide lock member is mounted on the connector, independent of the eject mechanism, and is engageable with the slider to hold the slider in its inserted connection position. An ejection control member is mounted on the housing for releasing the slide lock member from engagement with the slider to allow the slider and memory card to be ejected.

As disclosed herein, the terminal-mounting section of the housing is a rear section, and at least one side wall section of the housing extends forwardly from one end of the rear section. The card eject mechanism and the ejection control member are disposed on the side wall section. The card eject mechanism is a push/push mechanism, whereby a first push on the memory card moves the memory card and the slider to the inserted connection position. The slide lock member is located to hold the slider in the inserted connection position.

A second push on the ejection control member releases the slide lock member from engagement with the slider to allow the slider and memory card to be ejected.

According to one aspect of the disclosure of the present application, a metal shell is mounted on the housing and combines therewith to define the card-receiving cavity. The cavity has a front insertion opening to permit insertion and withdrawal of the memory card into and out of the connector. The slide lock member is on the metal shell. In the preferred embodiment, the shell is stamped and formed from sheet metal material, and the slide lock member is stamped and formed as a cantilevered spring arm integral with the shell.

According to other aspects of the disclosure of the present application, the spring arm which forms the slide lock member has a lock portion engageable with a lock shoulder on the slider automatically as the slider and memory card are moved to the inserted connection position. The ejection control member is mounted alongside the card eject mechanism for movement generally parallel to the movement of the slider. The ejection control member includes a manually engageable portion outside the housing. A spring biases the ejection control member to a retracted inoperative position.

Other objects, features and advantages of the disclosure of the present application will be apparent from the following detailed description taken in connection with the accompanying drawings.

BRIEF DESCRIPTION OF THE FIGURES

The features of the disclosure of the present application which are believed to be novel are set forth with particularity in the appended claims. The disclosure of the present application, together with its objects and the advantages thereof, may be best understood by reference to the following description taken in conjunction with the accompanying drawings, in which like reference numerals identify like elements in the FIGS. and in which:

DESCRIPTION OF THE PREFERRED EMBODIMENTS

Figure 1:
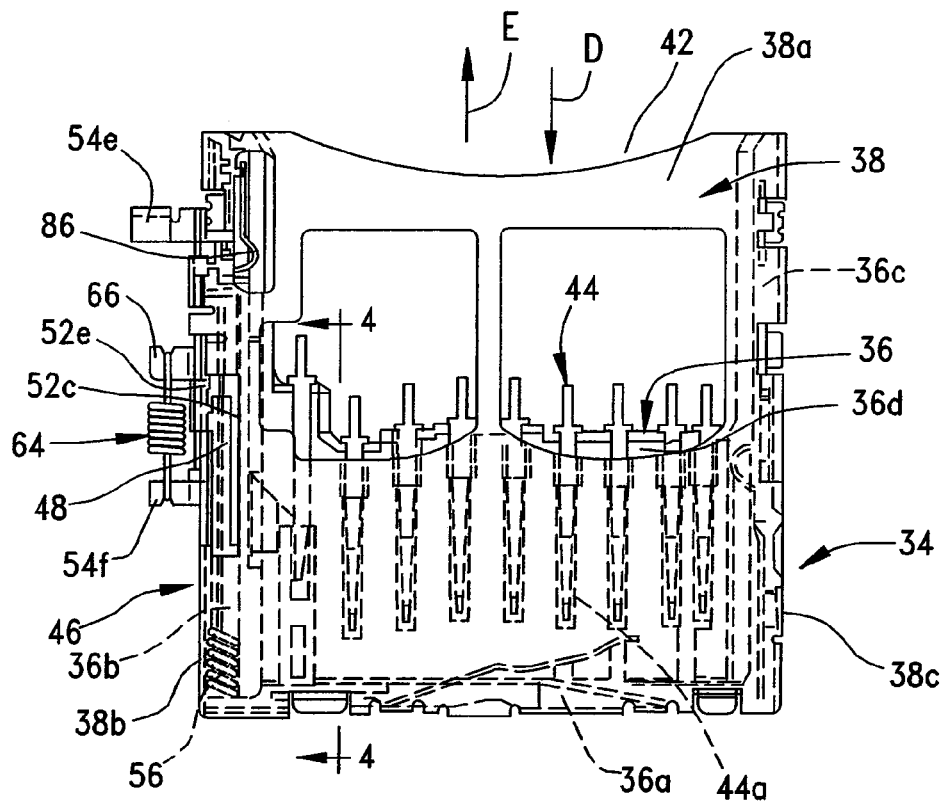
FIG. 1 is a top plan view of a memory card connector according to the disclosure of the present application.

Referring to the drawings in greater detail, and first to FIGS. 1-4, the disclosure of the present application is embodied in a memory card connector, generally designated 34, which includes an insulative housing, generally designated 36, substantially covered by a stamped and formed metal shell, generally designated 38. The housing and the shell combine to form a card-receiving cavity 40 which has a front insertion opening 42 to permit insertion of a memory card into the cavity in the direction of arrow "D" (FIG. 1) and withdrawal of the memory card from the cavity into the direction of arrow "E." Housing 36 may be molded of dielectric material such as plastic or the like, and metal shell 38 may be stamped and formed out of sheet metal material such as stainless steel or the like.

Insulative housing 36 of connector 34 is generally U-shaped and includes a rear terminal-mounting section 36a and a pair of side wall sections 36b and 36c extending forwardly from opposite ends of the rear section. The rear section includes an integral floor 36d (FIG. 3), which spans the side walls sections at the bottom of cavity 40.

A plurality of conductive terminals, generally designated 44, are mounted on the rear section of the housing on floor 36d. The terminals have contact portions 44a which project forwardly into cavity 40, above floor 36d, for engaging appropriate contacts on the memory card.

Metal shell 38 of connector 34 includes a top wall 38a and a pair of opposite longitudinal side walls 38b and 38c. The top wall of the metal shell, basically, forms the top of cavity 40.

Figure 5:
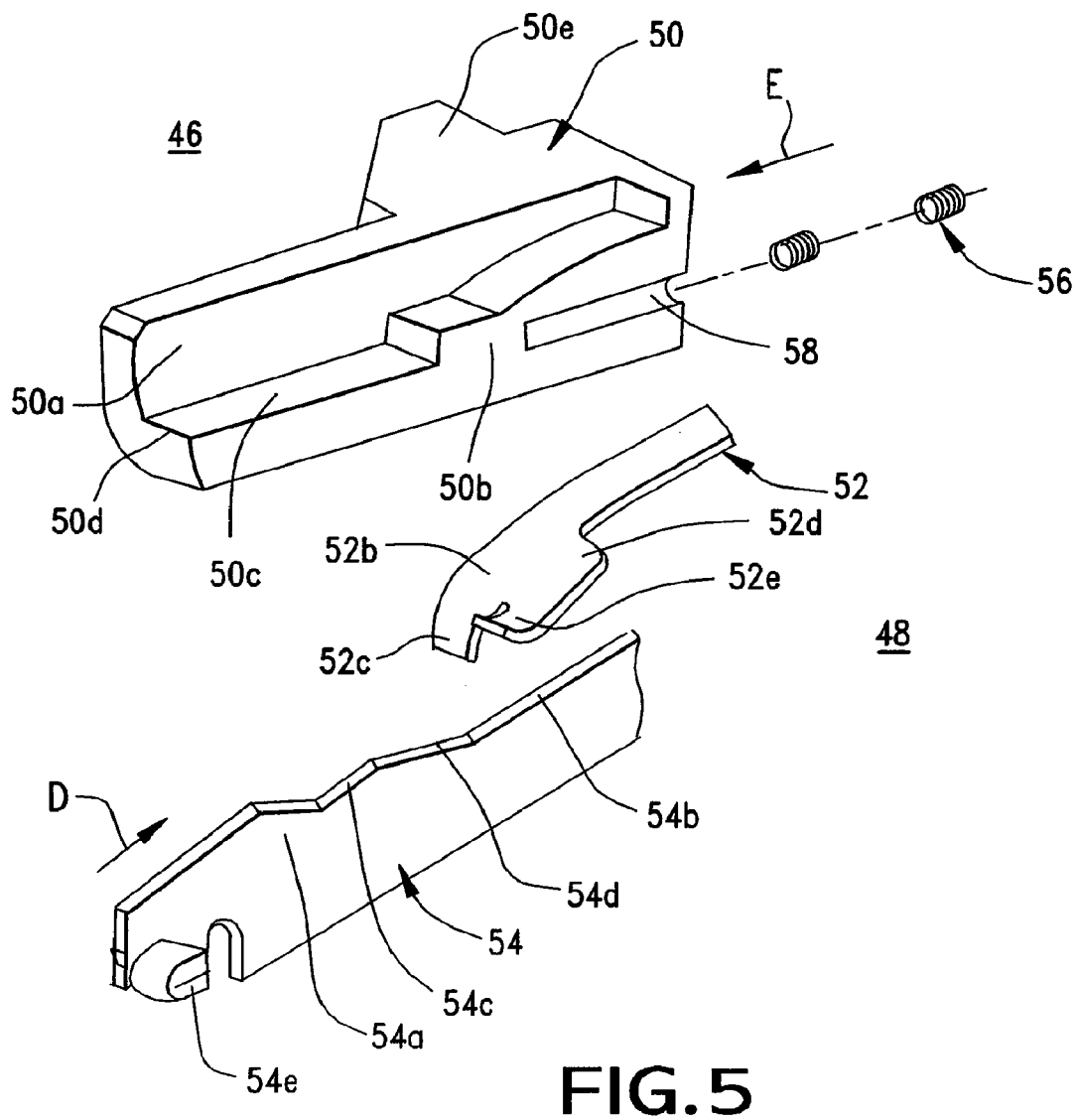
FIG. 5 is an enlarged, fragmented, exploded perspective view of the slider of the card eject mechanism, along with the slide lock member and the ejection control member of the disclosure of the present application.

A card eject mechanism, generally designated 46, and a slider control mechanism, generally designated 48, are mounted along side wall section 36b of housing 36 and side wall 38b of metal shell 38. FIG. 5 shows various components of card eject mechanism 46 and slider control mechanism 48 in their general positional orientation within the connector. Specifically, the card eject mechanism includes a slider, generally designated 50, and the slider control mechanism includes a slide lock member, generally designated 52, and an ejection control member, generally designated 54. A coil spring, generally designated 56, is positioned partially into a bore 58 in the rear end of slider 50 to constantly bias the slider forwardly in the withdrawal direction indicated by arrow "E."

Slider 50 is a one-piece structure unitarily molded of dielectric material such as plastic or the like, similar to insulative housing 36. The slider has a central, partition wall 50a, which runs front-to-rear of the slider. A downwardly sloped step 50b is formed along the outside of partition wall 50a and leads to an upwardly sloped surface 50c that leads to a lock shoulder 50d at the front of the slider. The lock shoulder is generally perpendicular to the direction of sliding movement of the slider.

Figure 6:
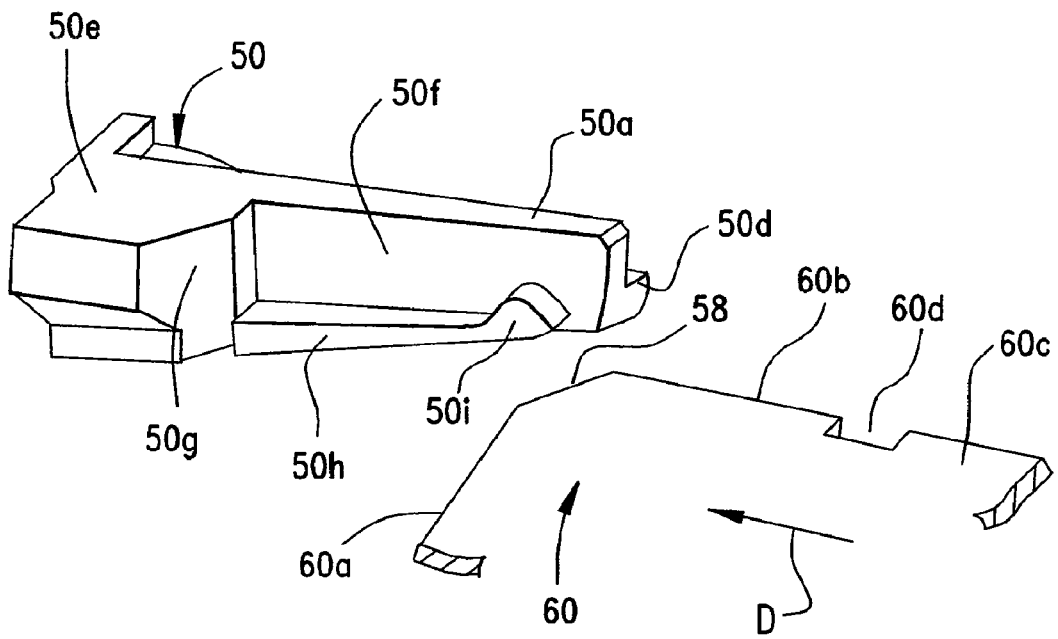
FIG. 6 is an enlarged perspective view of the slider, looking at the opposite side thereof in relation to FIG. 5, and in conjunction with a corner of a memory card.
Figure 7:
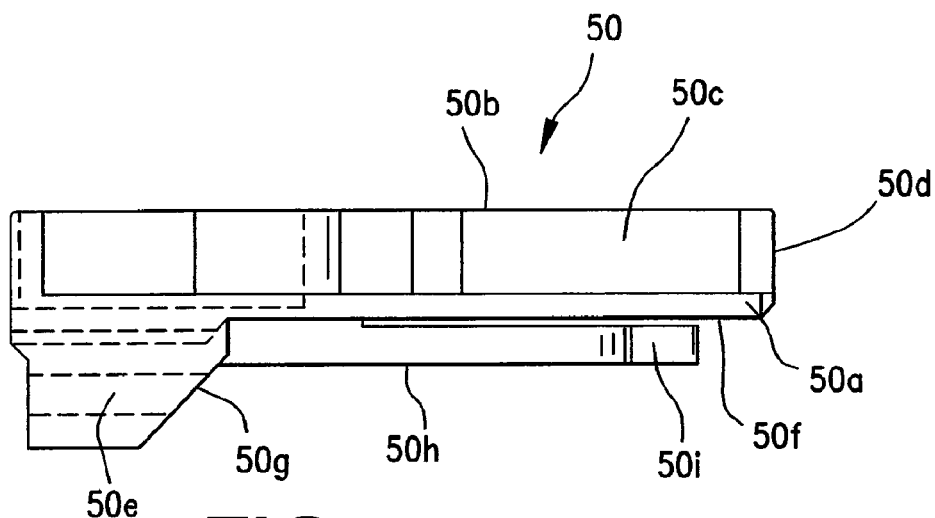
FIG. 7 is a top plan view of the slider.
Figure 8:
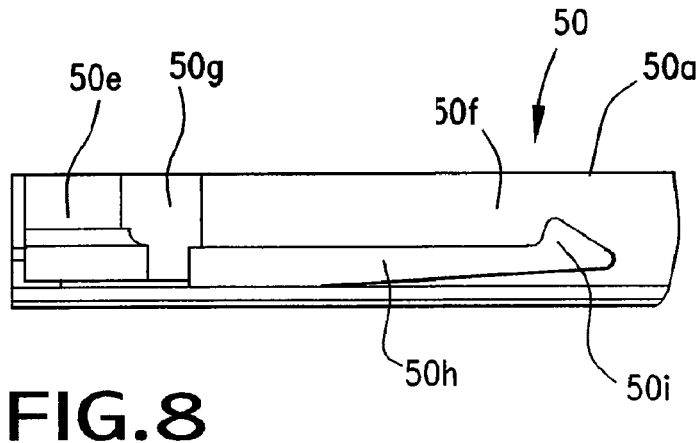
FIG. 8 is a side elevational view of the slider.

As best seen in FIGS. 6 and 8, a lateral enlargement 50e projects inwardly from an inner surface 50f of partition 50a of slider 50. The lateral enlargement has a chamfered corner 37 for abutting a polarizing corner 58 (FIG. 6) of a memory card, generally designated 60 and described hereinafter. A flexible, cantilevered engagement arm 50h projects forwardly of lateral enlargement 50e and is spaced from inner surface 50f of partition wall 50a. The engagement arm has an upwardly projecting hook 50i at the distal end thereof.

Still referring to FIG. 6, memory card 60 has a leading end or edge 60a, a side edge 60b, a top surface 60c and an engagement recess 60d in the side edge. When the memory card is inserted into the cavity of connector 34, hook 50i at the distal end of engagement arm 50h of slider 50 "snaps" into recess 60d at the side edge of the memory card, automatically as polarizing corner 58 of the memory card engages chamfered corner 50g of the slider. The slider and the memory card then move into and out of the connector as a unitary assembly.

Figures 12, 13:
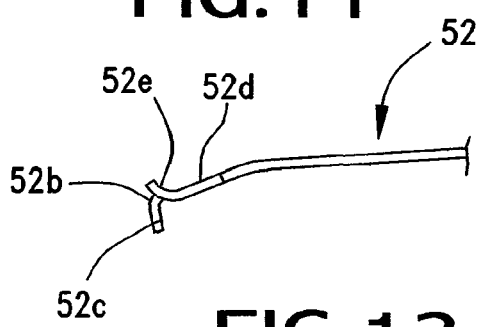
FIG. 12 is a top plan view of the slide lock member.
FIG. 13 is a side elevational view of the slide lock member.
Figure 14:
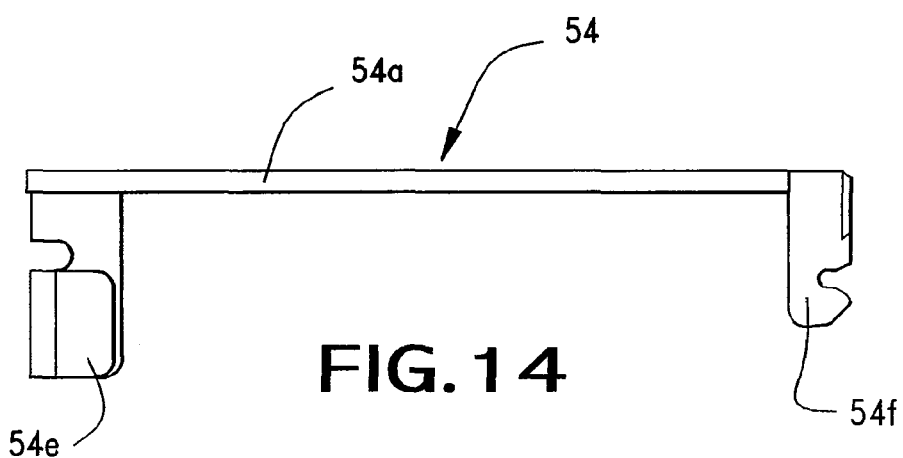
FIG. 14 is a top plan view of the ejection control member.
Figure 15:
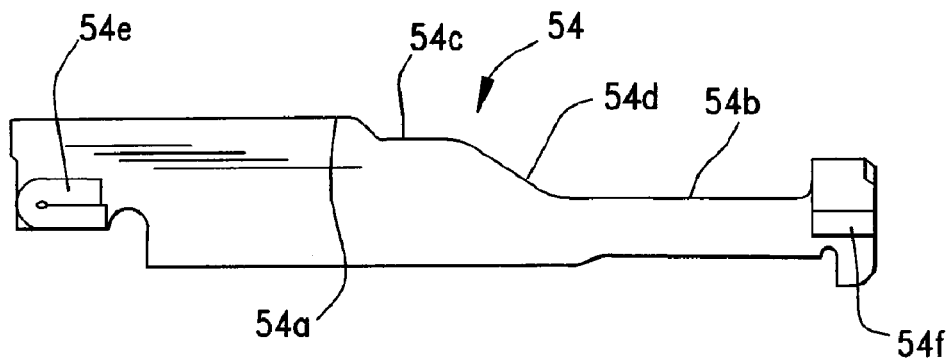
FIG. 15 is a side elevational view of the ejection control member.
Figures 16, 17:
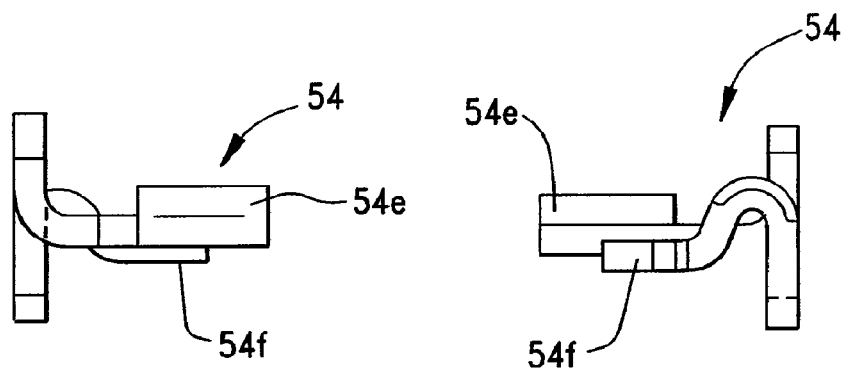
FIG. 16 is a front elevational view of the ejection control member.
FIG. 17 is a rear end view of the ejection control member.

Referring to FIGS. 12 and 13 in conjunction with FIG. 5, slide lock member 52 includes a cantilevered spring arm 52a, which is stamped and formed out of top wall 38a of metal shell 38. The distal end of the cantilevered spring arm is curved downwardly, as at 52b, and terminates in a lock portion or hook 52c. A lateral or offset portion 52d of the spring arm forms an upwardly curved hook 52e. Lock hook 52c engages lock shoulder 50d of slider 50. This occurs automatically as the slider and the memory card are moved to their fully inserted connection position.

Referring to FIGS. 14-17 in conjunction with FIG. 5, ejection control member 54 is stamped and formed of metal material and is located outside longitudinal side wall 38b of metal shell 38. As seen best in FIG. 15, the ejection control member has a step-like ridge formed on its upper edge 54a to define a bottom flat section 54b, a top flat section 54c and a sloped section 54d extending between the bottom and top flat sections. A manually engageable thumb portion 54e is formed at one end of the ejection control member, and a spring attachment portion 54f (FIG. 1) is formed at the opposite end of the ejection control member.

Figure 2:
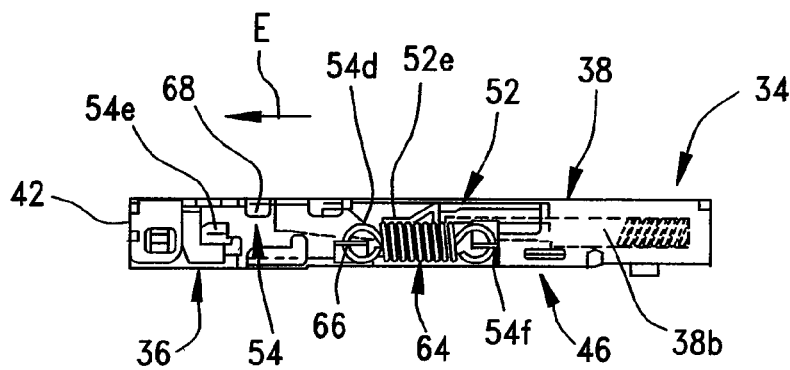
FIG. 2 is a side elevational view of the connector.
Figure 3:
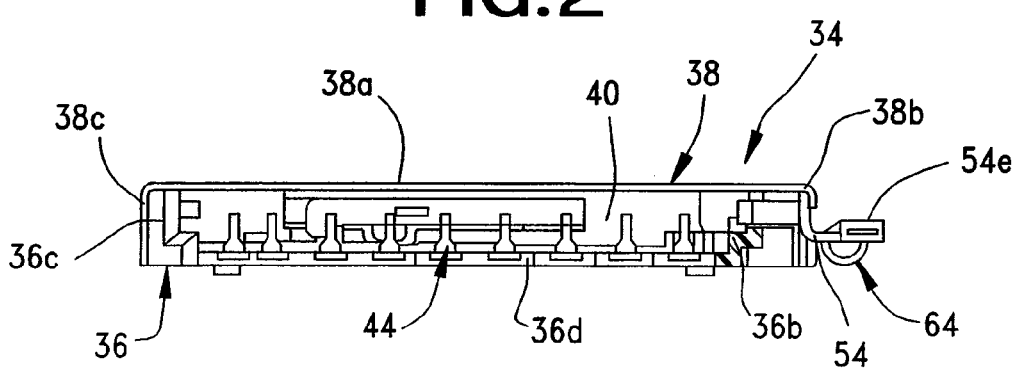
FIG. 3 is a front elevational view of the connector, looking at the opening to the card-receiving cavity.
Figure 4:
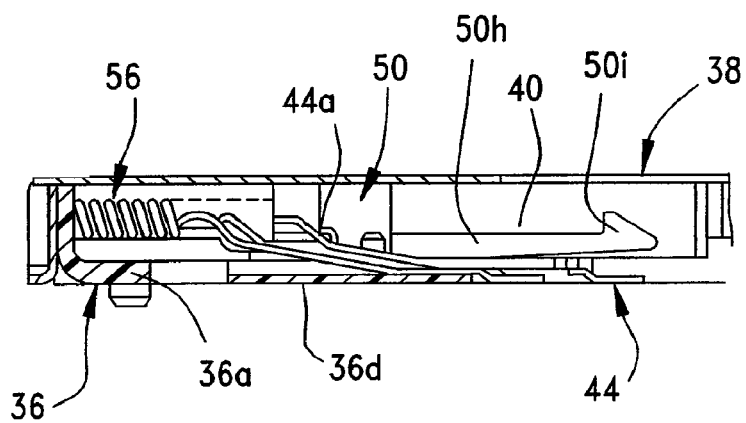
FIG. 4 is a fragmented vertical section taken generally along line 4-4 in FIG. 1.

As best seen in FIG. 1, a coil spring 64 is attached between spring attachment portion 54f of the ejection control member and a spring engagement flange 66 which is stamped and formed out of side wall 38b of metal shell 38 to project outwardly there from. As best seen in FIG. 2, ejection control member 54 is slidably mounted to longitudinal side wall 38b of the metal shell by mounting flanges 68 which also are stamped and formed/raised from side wall 38b of the metal shell. When the ejection control member moves rearwardly in the card-insertion direction, coil spring 64 is stretched. When the pushing force is removed, the coil spring returns the ejection control member back to its initial stress-free position shown in FIG. 2.

Figure 18:
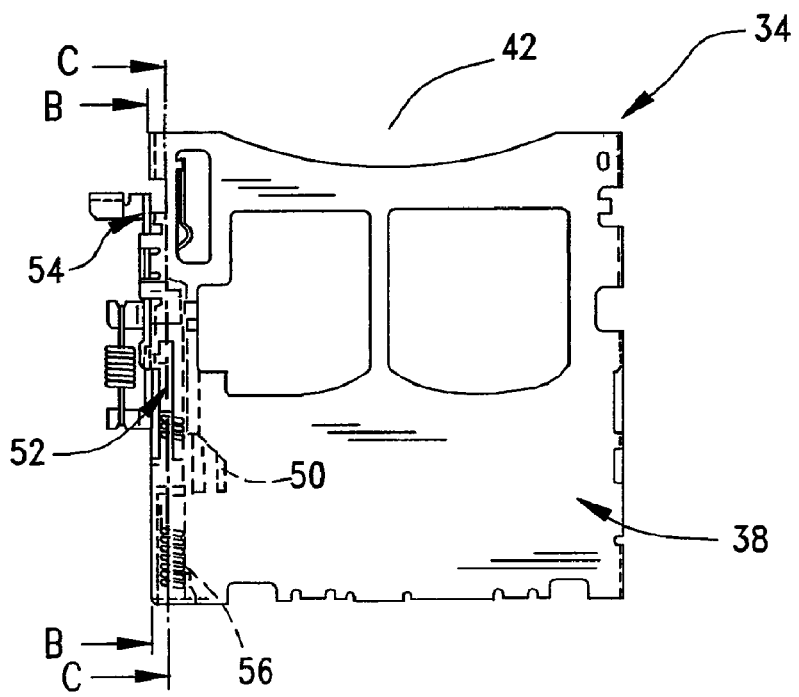
FIG. 18 is a top plan view of the connector, without a memory card.
Figure 19:
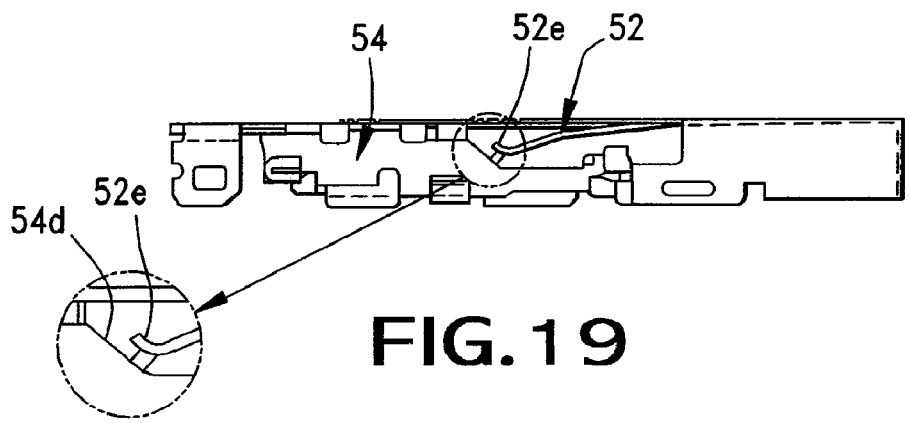
FIG. 19 is a vertical section taken generally along line B-B in FIG. 18.
Figure 20:
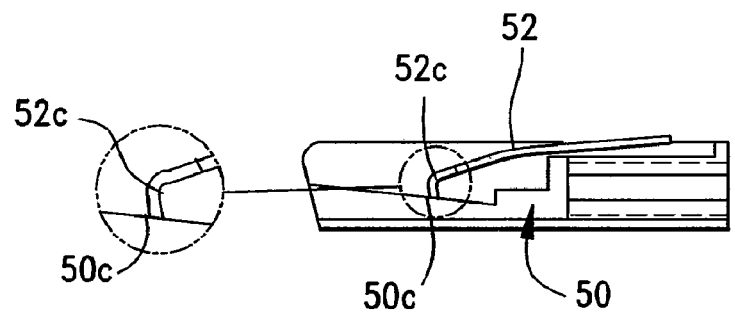
FIG. 20 is a fragmented vertical section taken generally along line C-C in FIG. 18.

FIGS. 18-20 show memory card connector 34 without memory card 60 inserted thereinto. Slider 50 of card eject mechanism 46 is biased forwardly by coil spring 56 to an ejection or withdrawal position. Ejection control member 54 is biased by coil spring 64 to its inoperative position shown in FIGS. 2 and 19. Lock hook 52c of slide lock member 52 engages surface 50c of slider 50 which biases the slide member downwardly while upwardly curved hook 52e on lateral projection 52d of the slide lock member confronts sloped edge section 54d of ejection control member 54, leaving a narrow gap therebetween as seen in FIG. 19.

Figure 9:
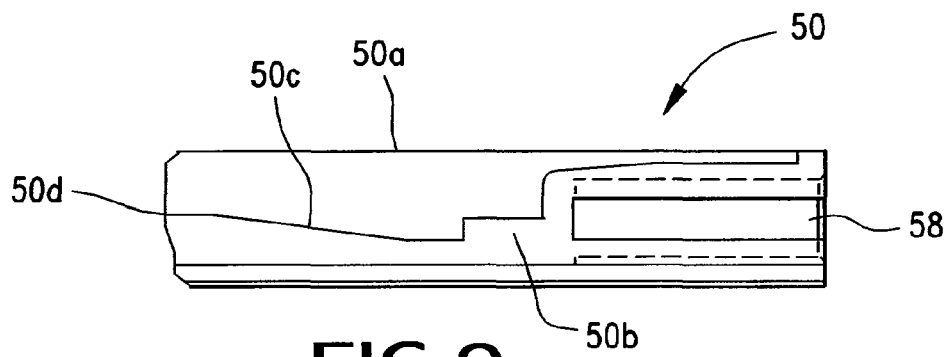
FIG. 9 is a side elevational view of the slider, looking at the opposite side of FIG. 8.
Figure 10:
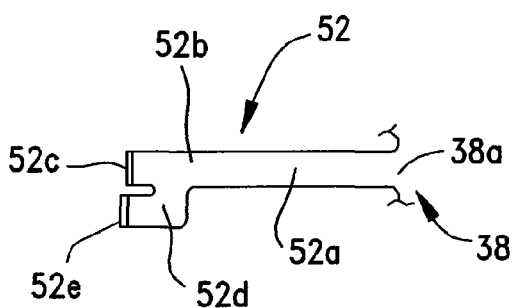
FIG. 10 is a rear end elevational view of the slider.
Figure 11:
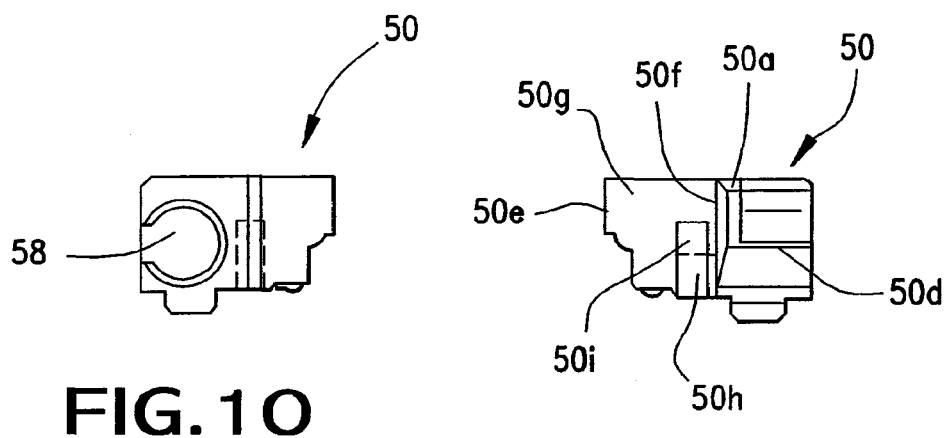
FIG. 11 is a front elevational view of the slider.
Figure 21:
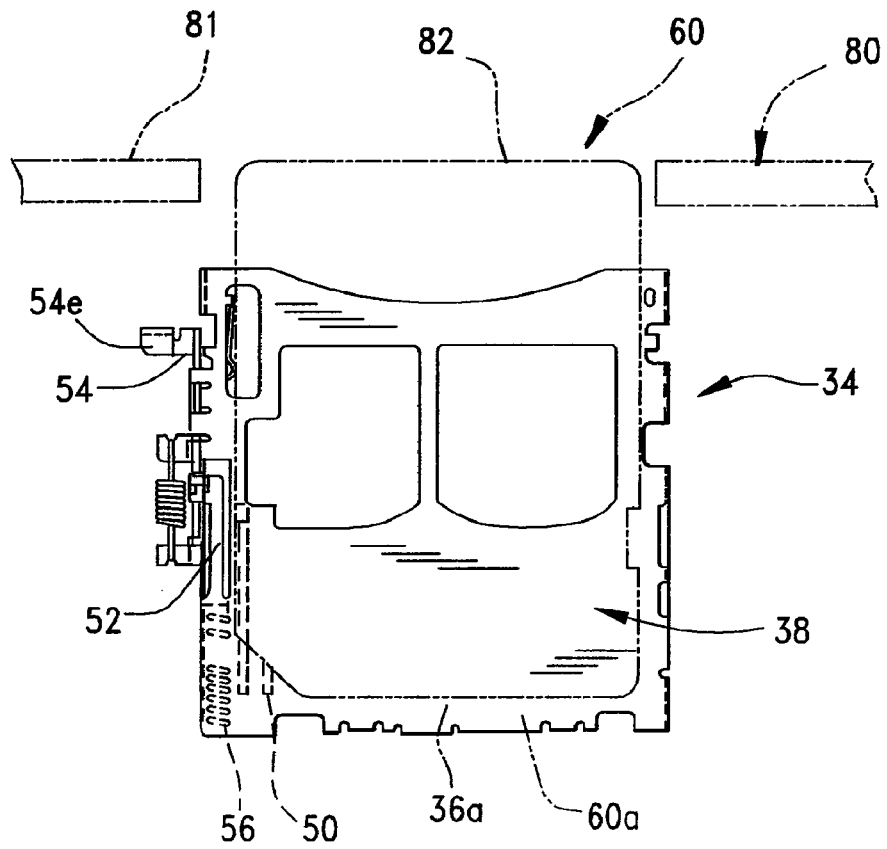
FIG. 21 is a view similar to that of FIG. 18, with a memory card inserted into the connector.
Figure 22:
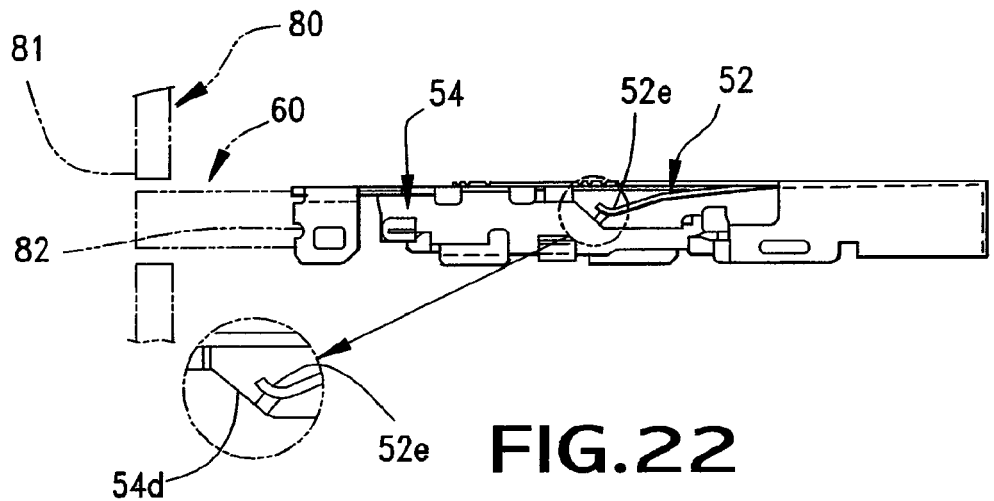
FIG. 22 is a view similar to that of FIG. 19, with the memory card inserted into the connector.
Figure 23:
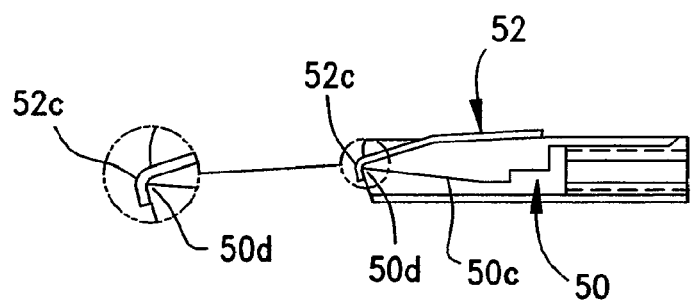
FIG. 23 is a view similar to that of FIG. 20, with the memory card inserted into the connector.

FIGS. 21-23 shows memory card 60 pushed into connector 34 to its fully inserted connection position, with leading end 60a of the card reaching the rear section 36a of housing 36. As the card is inserted into cavity 40, hook 50i (FIG. 6) on engagement arm 50h of slider 50 snaps into recess 60d of the memory card, as polarizing corner 58 of the card engages chamfered corner 50g of the slider. The card and slider then move together into the connector while compressing coil spring 56 of the card eject mechanism. As the upwardly sloped surface 50c (see FIG. 9) of slider 50 moves rearwardly, lock hook 50c of slide lock member 52 snaps into locking engagement with lock shoulder 50d of the slider as seen in FIG. 23. Therefore, the slider and the memory card are locked and held in the inserted connection position.

Figure 24:
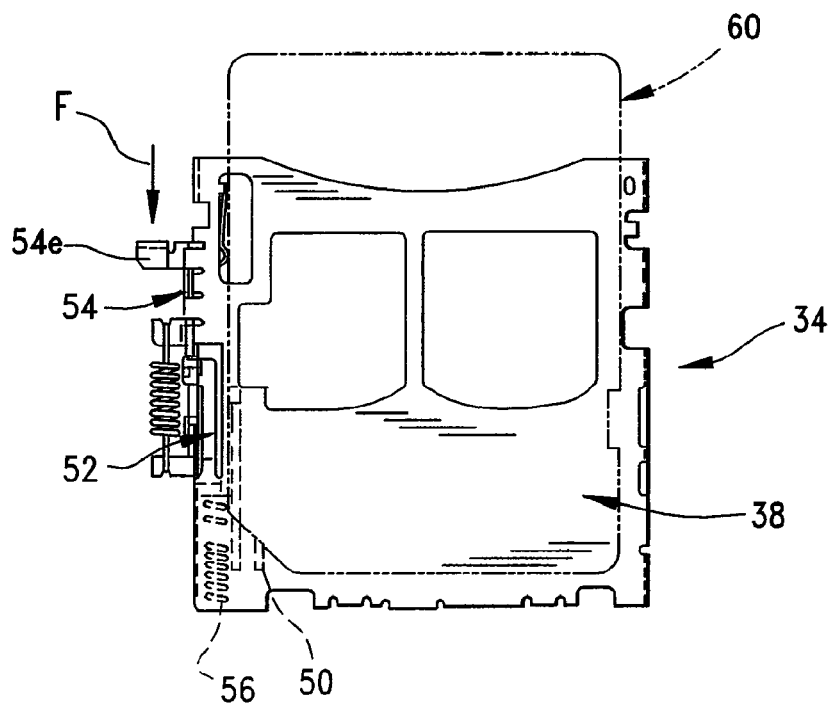
FIGS. 24-26 are views similar to that of FIGS. 21-23, but illustrating the connector in a first step of ejecting the memory card.
Figure 25:
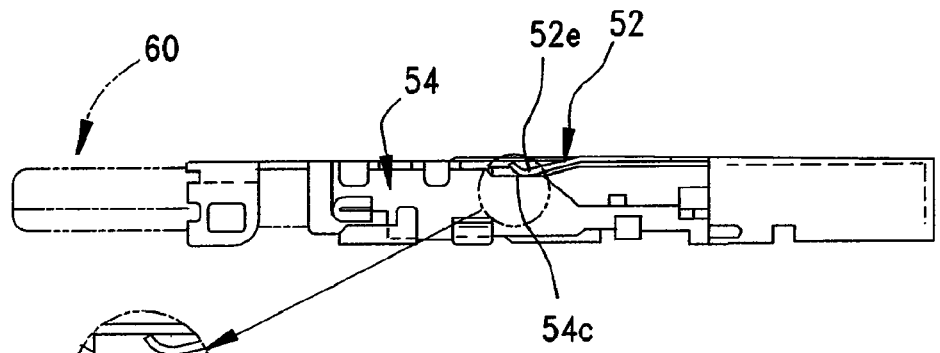
Figure 26:
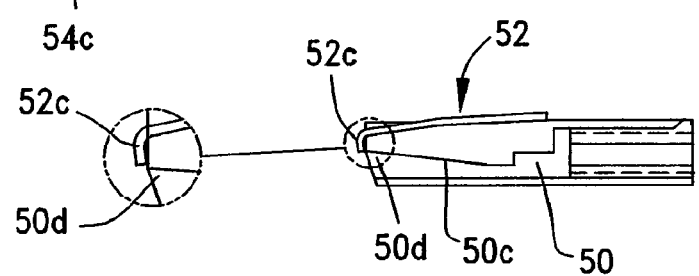
Figure 27:
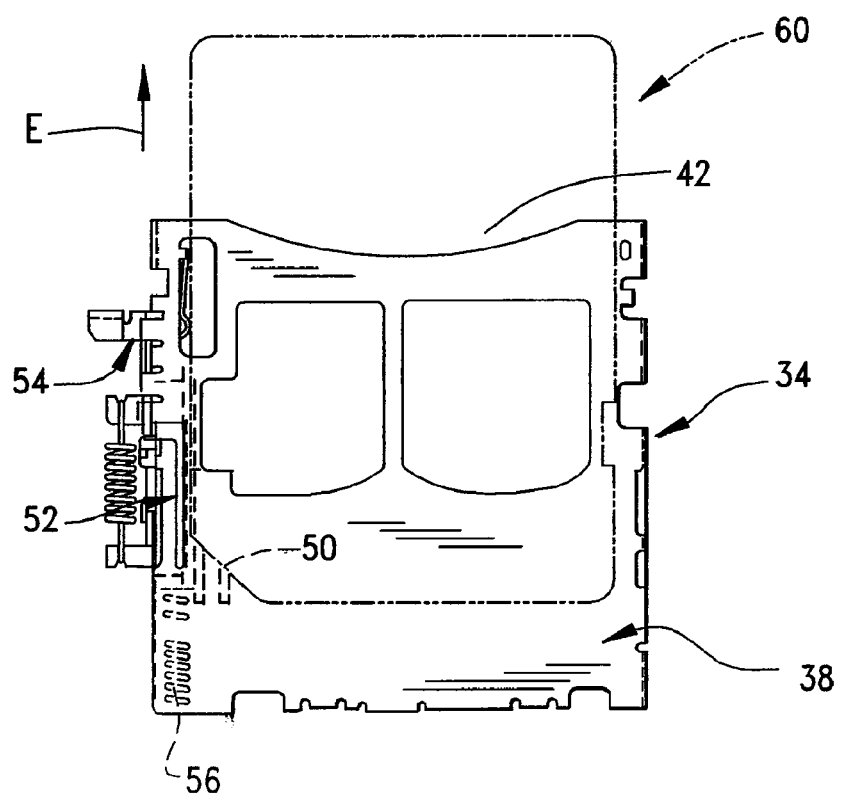
FIGS. 27-29 are views similar to that of FIGS. 24-26, but showing a second step in ejecting the memory card.
Figure 28:
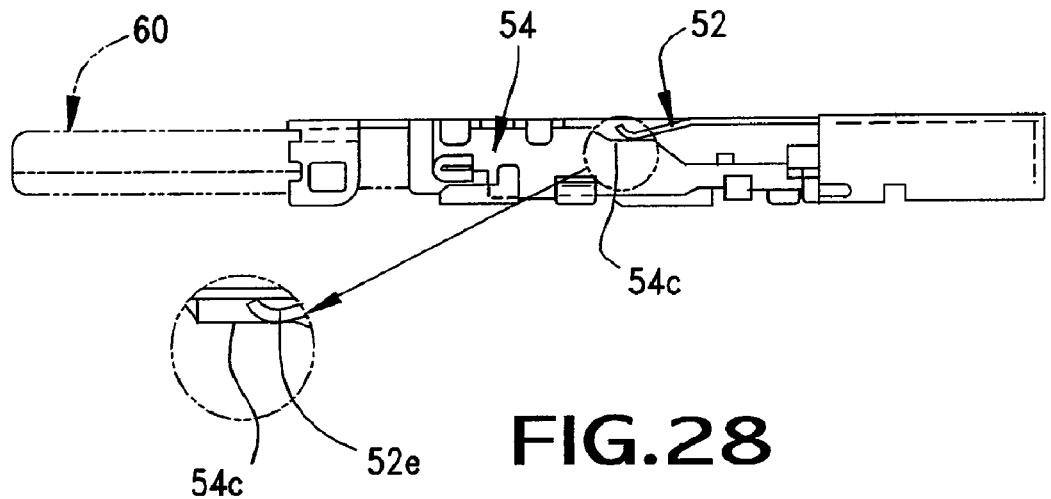
Figure 29:
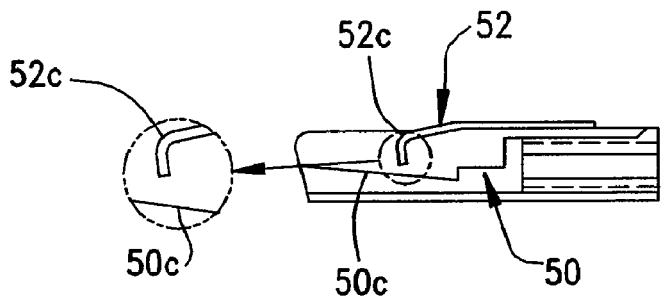

FIGS. 24-29 show how memory card 60 is ejected from connector 34. Specifically, ejection and/or removal of the memory card can be performed by pushing on the manually engageable thumb portion 54e of ejection control member 54 in the direction of arrow "F" (FIG. 24). Inward movement of the ejection control member causes the upwardly curved hook 50d of slide lock member 52 to ride upwardly along sloped edge section 54d of ejection control member 54. This causes lock hook 52c of the slide lock member to move out of locking engagement with lock shoulder 50d of slider 50 as the upwardly curved hook 52e of the slide lock member moves onto the top flat section 54c of ejection control member 54 to maintain cantilevered spring arm 52a of the slide lock member in a raised condition. As a result, slider 50 is unlocked and the slider, along with memory card 60, are ejected under the influence of coil spring 56 of the card eject mechanism, i.e., biasing the card back to its initial position shown in FIG. 22. FIGS. 27-29 show the memory card moved in the withdrawal direction "E" after the card is ejected by the eject procedure described above.

As can be understood, in removing memory card 60 from connector 34, ejection control member 54 is pushed inwardly rather than pushing on the memory card. Therefore, as seen in FIGS. 21 and 22, the connector can be mounted in a housing, generally designated 80, having an outer surface 81 which is generally flush with a rear end 82 of memory card 60. The card does not project beyond surface 81 of the housing, thereby preventing unintended removal of the card, which, otherwise, would occur by inadvertently pushing on the card. The rearwardly engageable thumb piece 54e of ejection control member 52 can project through a longitudinal slot (not shown) in housing 80. A button of insulating material (not shown) may be attached to thumb portion 54e. Alternatively, connector 34 could be equipped with a mechanism for moving thumb portion 54e in the card-insertion direction.

Figure 30:
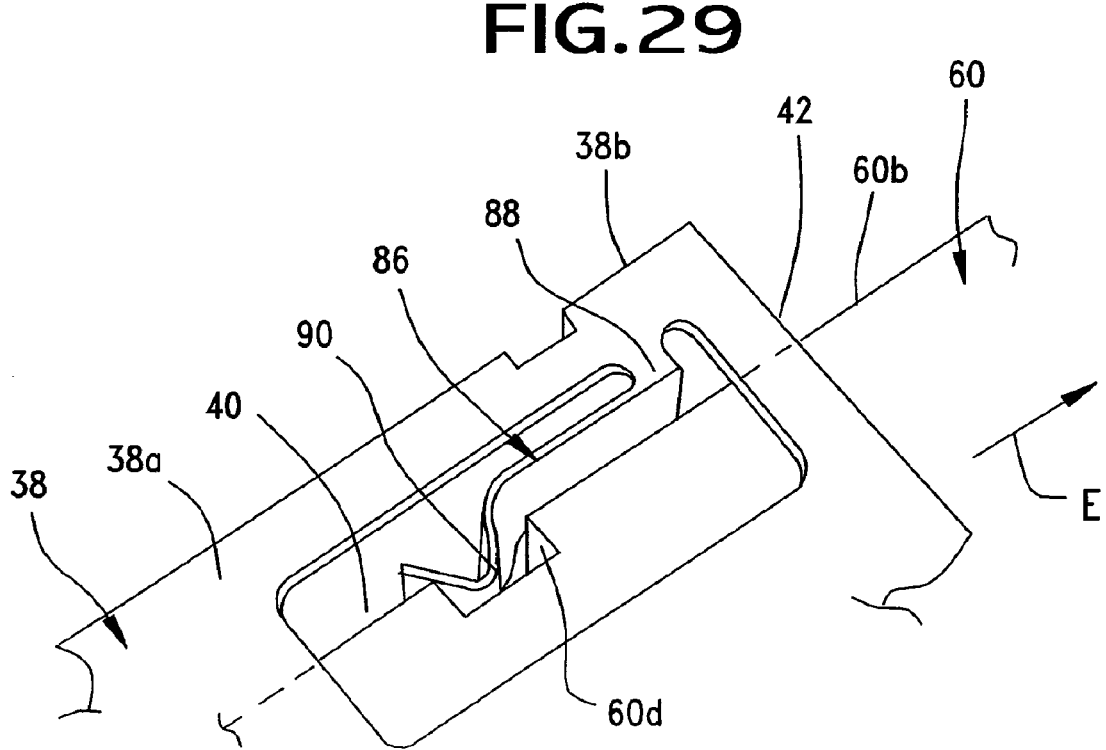
FIG. 30 is an enlarged, fragmented perspective view showing a mechanism to prevent the memory card from overrunning its withdrawal position.
Figure 31:
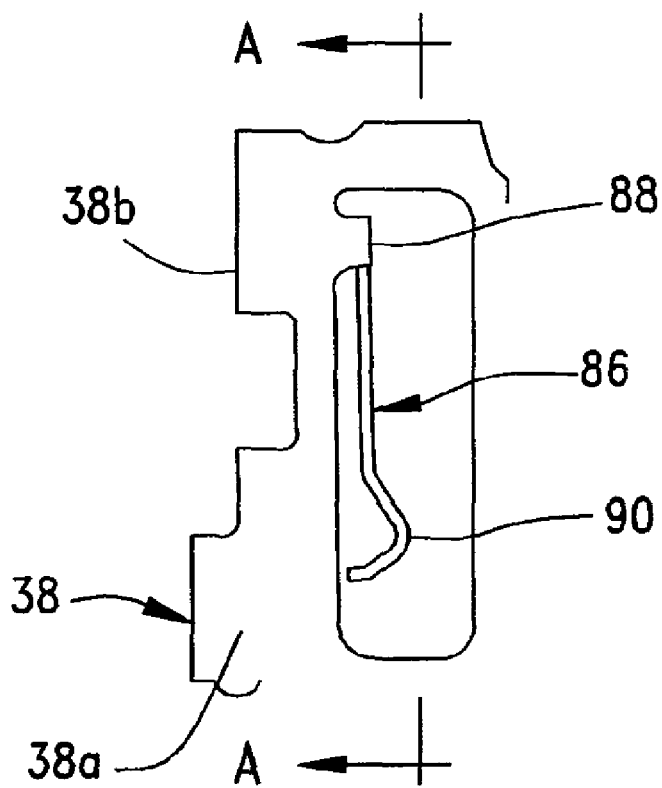
FIG. 31 is a top plan view of the mechanism of FIG. 30, on a reduced scale.
Figure 32:
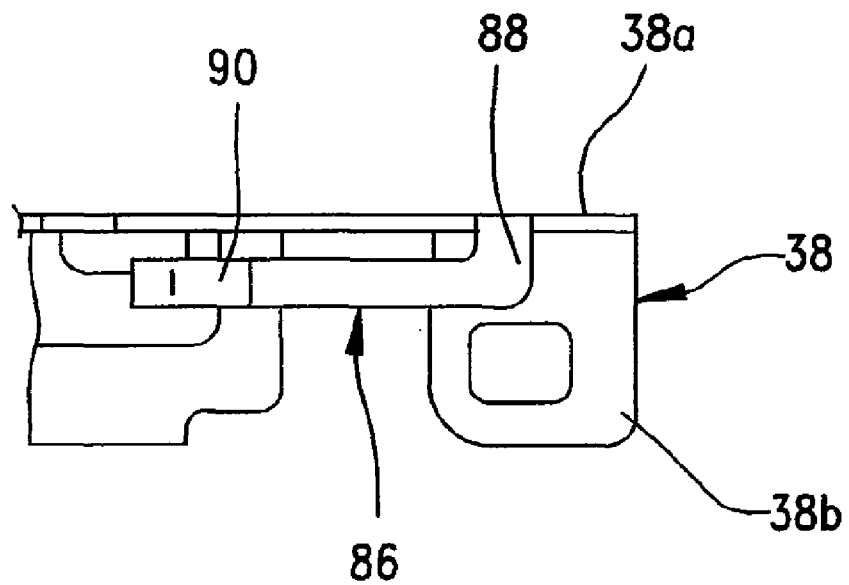
FIG. 32 is a vertical section taken generally along line A-A in FIG. 31.

Finally, FIGS. 30-32 show a mechanism for preventing over-running of memory card 60 in the ejection direction "E" after being released by the card eject mechanism and slider control mechanism. In other words, it would be desirable to stop the memory card at the position of shown in FIG. 27 so that the card does not move forwardly and fall out of the connector under the influence of inertia when slider 50 stops at its withdrawal position.

More particularly, the anti-over-running mechanism is shown in FIGS. 30-32 as a cantilevered leaf spring, generally designated 86, which is stamped and formed out of top wall 38a of metal shell 38. The leaf spring is connected to the top wall of the metal shell at a base 88 and has an inwardly directed V-shaped hook 90 formed at the distal end of the leaf spring. It can be seen that leaf spring 86 is near front insertion opening 42 of cavity 40.

In operation, hook 90 of the anti-over-running leaf spring 86 is positionable into recess 60d in side edge 60b of memory card 60. When the memory card leaves slider 50 and continues further movement in the insertion direction under the influence of inertia, recess 60d at the side edge of the card meets hook 90, and leaf spring 86 biases or "snaps" the hook into the recess to stop the card and prevent the card from falling down or out of the connector.

In conclusion, it can be seen from the above detailed description that memory card connector 34 has a card eject mechanism in which a slider control mechanism is incorporated. The mechanisms create a push/push system but the system is not of the conventional "push/push" type to the extent that the memory card, itself, is not pushed twice. With the embodiment of the disclosure of the present application, the memory card first is pushed to its inserted connection position, and then the ejection control memory 48 is pushed to eject the memory card from the connector.

It will be understood that the disclosure of the present application may be embodied in other specific forms without departing from the spirit or central characteristics thereof. The present examples and embodiments, therefore, are to be considered in all respects as illustrative and not restrictive, and the disclosure of the present application is not to be limited to the details given herein.

What is claimed is:

1. A memory card connector, comprising:
   an insulative housing, the insulative housing having a terminal-mounting section which mounts a plurality of conductive terminals having contact portions for engaging appropriate contacts on a memory card and which at least in part defines a card-receiving cavity for receiving the memory card;
   a metal shell, the metal shell mounted on the insulative housing and combining therewith to define the card-receiving cavity, the metal shell having a front insertion opening to permit insertion and withdrawal of the memory card into and out of the memory card connector;
   a card eject mechanism, the card eject mechanism including a slider movably mounted on the insulative housing and engageable with the memory card for movement thereof into and out of the cavity between an inserted connection position and a withdrawal position;
   a spring biasing member, the spring biasing member biasing the slider in a direction from the inserted connection position towards the withdrawal position;
   a slide lock member, the slide lock member extending from the metal shell, independent of the card eject mechanism and engageable with the slider to hold the slider in the inserted connection position;
   an ejection spring, the ejection spring mounted on the connector for releasing the slide lock member from engagement with the slider to cause the slider and memory card to be ejected; and
   a catching mechanism for catching the memory card in its movement in the ejection direction and preventing the memory card from moving under inertia beyond the withdrawal position;
   wherein the catching mechanism is integral with the metal shell.

2. The memory card connector of claim 1, wherein said catching mechanism is located near the front insertion opening of the card-receiving cavity.

3. The memory card connector of claim 2, wherein the metal shell is stamped and formed from sheet metal material and the catching mechanism is stamped and formed therefrom.

4. The memory card connector of claim 3, wherein the catching mechanism is engageable with a recess in the memory card.

5. The memory card connector of claim 4, wherein the catching mechanism comprises a cantilevered leaf spring.

6. The memory card connector of claim 3, wherein the metal shell includes a top wall and at least one side wall, and the catching mechanism is stamped and formed from the top wall of the shell.

7. The memory card connector of claim 6, wherein the catching mechanism comprises a cantilevered spring.

8. A memory card connector, comprising:
   an insulative housing, the insulative housing having a rear terminal-mounting section, which mounts a plurality of conductive terminals having contact portions for engaging appropriate contacts on a memory card, and at least one side wall section, the side wall section extending forwardly from one end of the rear terminal-mounting section;
   a metal shell, the metal shell mounted on the insulative housing and combining therewith to define a card-receiving cavity having a front insertion opening to permit insertion and withdrawal of the memory card into and out of the connector between an inserted connection position and a withdrawal position;
   a card eject mechanism, the card eject mechanism including a slider movably mounted on the side wall section of the insulative housing and engageable with the memory card for movement thereof;
   an ejection spring, the ejection spring mounted on the connector for releasing the slide lock member from engagement with the slider to cause the slider and memory card to be ejected; and
   a catching mechanism for catching the memory card in its movement in the ejection direction and preventing the memory card from moving under inertia beyond the withdrawal position;
   wherein the catching mechanism is integral with the metal shell.

9. The memory card connector of claim 8, wherein said catching mechanism is located near the front insertion opening of the card-receiving cavity.

10. The memory card connector of claim 9, wherein the metal shell is stamped and formed from sheet metal material and the catching mechanism is stamped and formed therefrom.

11. The memory card connector of claim 10, wherein the catching mechanism is engageable with a recess in the memory card.

12. The memory card connector of claim 11, wherein the catching mechanism comprises a cantilevered leaf spring.

13. The memory card connector of claim 10, wherein the metal shell includes a top wall and at least one side wall, and the catching mechanism is stamped and formed from the top wall of the shell.

14. The memory card connector of claim 13, wherein the catching mechanism comprises a cantilevered spring.

* * * * *